US008065348B1

(12) United States Patent
Buchsbaum et al.

(10) Patent No.: US 8,065,348 B1
(45) Date of Patent: *Nov. 22, 2011

(54) DATA STORAGE TECHNIQUE

(75) Inventors: Adam Louis Buchsbaum, Madison, NJ (US); Kiem-Phong Vo, Berkeley Heights, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 394 days.

This patent is subject to a terminal disclaimer.

(21) Appl. No.: 12/380,268

(22) Filed: Feb. 25, 2009

Related U.S. Application Data

(63) Continuation of application No. 10/754,994, filed on Jan. 10, 2004, now Pat. No. 7,536,418.

(60) Provisional application No. 60/439,215, filed on Jan. 10, 2003.

(51) Int. Cl.
*G06F 17/30* (2006.01)
(52) U.S. Cl. ............ 707/812; 707/823; 707/824; 711/4; 711/165
(58) Field of Classification Search .................. 707/812, 707/823, 824; 711/4, 165
See application file for complete search history.

(56) References Cited

U.S. PATENT DOCUMENTS

| | | | | |
|---|---|---|---|---|
| 5,884,093 A * | 3/1999 | Berenguel et al. | ................ | 710/1 |
| 6,665,784 B2 * | 12/2003 | Ihde et al. | ...................... | 711/170 |
| 6,996,695 B2 * | 2/2006 | Masse | ........................... | 711/173 |
| 7,054,889 B2 * | 5/2006 | Todo et al. | ............................ | 1/1 |
| 7,162,606 B2 * | 1/2007 | Wong et al. | ................... | 711/170 |
| 7,370,240 B2 * | 5/2008 | Dawkins et al. | ................ | 714/45 |
| 7,788,505 B2 * | 8/2010 | Porter et al. | .................. | 713/193 |
| 7,844,792 B2 * | 11/2010 | Lange et al. | .................. | 711/170 |

* cited by examiner

*Primary Examiner* — Debbie Le

(57) ABSTRACT

A preload library partitions certain files into segments and transforms the data of the files on a segment by segment basis, each independently of the other. The transformed segments are then stored as part of a transformed file, with each segment corresponding to a bag containing a chunk (of transformed data) and a gap which permits the chunks to grow when data of the segment is modified during a write operation. The bags are followed by a chunk map which contains metadata defining the compressed version of each segment. The preload library intercepts system calls from applications to the OC specifying access to specific segments of a transformed file. The preload library identifies the chunks corresponding to the specified segments, retrieves and reverses the transform on those chunks and passes the data to the application requesting it. For a system call to write data to certain segments, the data is modified and re-transformed by the library before being written back to disk. A preload library provides improved random access into transformed (e.g. compressed, encrypted, etc.) files.

9 Claims, 3 Drawing Sheets

DATA STORAGE TECHNIQUE

CROSS-REFERENCE TO RELATED APPLICATIONS

This is a continuation of application Ser. No. 10/754,994 filed Jan. 10, 2004 now U.S. Pat. No. 7,536,418, which claimed the benefit of U.S. provisional application No. 60/439,215, filed Jan. 10, 2003.

This application hereby incorporates by reference U.S. published patent application 2006/0015535, published Jan. 19, 2006, which is the published version of the above-referenced parent application Ser. No. 10/754,994.

BACKGROUND

There is an exponentially increasing disparity between CPU (central processing unit) speeds and disk bandwidth Moore's law predicts a doubling of processor speed every 18 months, whereas disk bandwidth has been doubling only every 2.2 years. The result is an I/O (input/output) bottleneck that undermines many of the advances in processing speed and memory capacity. The process of simply getting data into and out of core memory takes too long. In cases where data does not even fit in main memory, paradigms like external memory and streaming algorithms have been explored as alternatives to the RAM model for designing algorithms. Often, though, increases in memory capacity obviate the need to favor I/O over RAM complexity. Still, simply getting the input from disk to algorithm comprises a significant portion of the time spent by an application.

Lossless compression has long been used to reduce storage requirements and network transmission costs. Compressing data can help reduce the amount of data that must be accessed from main memory and therefore may be useful in mitigating the I/O bottleneck. Consider transferring b bytes from disk to memory. If the nominal disk bandwidth is d bytes/second, it requires b/d time to effectuate the transfer. If the data can be compressed by some compressor with compression ratio r (the ratio of the size of the compressed data to that of the original) however, and the uncompression speed is $u_r$ bytes/second (compression and uncompression speeds typically depend on the resulting compression ratio, which tends to be similar for different files from the same domain or source), then it takes $r(b/d)+r(b/u_r)$ time to read and uncompress the compressed data. Storing the compressed data therefore speeds data transfer whenever $rb(1/d+1/u_r)<b/d$, or equivalently whenever $$u_r > d(r/(1-r)) \qquad (1)$$

Equation (1) yields several useful observations. First, the benefit of compression is independent of the amount of data being transferred when assuming sufficient data is available to realize the assumed compression ratio. Second, for any fixed compression ratio, the benefit of compression increases proportionately to CPU speed, assuming that uncompression is CPU bound, as it is for compression schemes like Huffman, Lempel-Ziv, and Burrows-Wheeler. This mitigates the I/O bottleneck because increasing CPU speed directly speeds the transfer of data to applications when data is compressed. Third, for a given CPU, the benefit of compression depends on the compression ratio r. As r improves (i.e. gets smaller), so does r/(1−r), in that for compression to be worthwhile in terms of overall data transfer, the demand on uncompression speed relative to the disk bandwidth becomes less onerous.

Compression schemes used in practice (e.g., Huffman coding used in pack, Lempel-Ziv coding used in compress, gzip, and zlib, and the Burrows-Wheeler transform used in bzip) all share the characteristic that uncompression must start from the beginning of the compressed data. That is, to retrieve any byte requires uncompressing the entire text up to the desired access point. This complicates any application that requires arbitrary access into the data While some theoretical advances have been made in the area of string matching in compressed data, general-purpose computation over compressed data remains elusive.

This access problem may be generalized to situations having the following characteristics. First, data is stored after being transformed in some manner (e.g. compression, encryption, etc.). Second, upon retrieving the data the transformation must be reversed (e.g. uncompression, decryption, etc.) before an application can act on the retrieved data Third, after retrieving the data and reversing the transform, if the data is then altered, the data must be re-transformed (e.g. compressed, encrypted, etc.) prior to writing the data back to some form of slow memory, such as a disk drive, tape, CD ROM, DVD or the like. Given the existing disparity between CPU speed and I/O bandwidth, it would be preferable when retrieving data not to have to reverse the transformation from the beginning of the file all the way to the point for which access is desired. Further, when writing altered data back to slow memory, it would be preferable not to have to re-transform the entire file from the beginning all the way up to the portion of the file that is being altered by the writing process. Rather, it would be more advantageous to be able to read and write access randomly to any point within the transformed file.

Some attempts have been made in the past to provide more random access to transformed data stored in slow memory. Typically, the file is partitioned into smaller components, and these components are individually transformed/untransformed (e.g. compressed/uncompressed, encrypted/decrypted, etc.) such that access can be made to a smaller component containing the requested data rather than having to transform and/or untransform the entire file up to the requested data Although these techniques have provided improved random access to a transformed file, they don't necessarily provide a means by which the segmentized components of the transformed file can be indexed and manipulated without significantly burdening the improved performance sought through random access.

One such technique as applied to compression of files partitions the original file into segments, then compresses each compressed segment individually and stores each compressed segment starting in the exact location in slow memory (usually disk memory) in which the original uncompressed segment was stored. Thus, while a more random access into the transformed file is facilitated without the need for additional indexing, the disk space is fragmented, disk space is wasted and access to disk is less than optimal. Another approach partitions the file into segments and then applies the transform (e.g. compression, encryption, etc.) to each segment. The resulting "chunks" (i.e. transformed segments) are then stored contiguously and packed tightly to avoid wasting space. However, if a particular segment is written to and data within that segment is thereby altered, its resulting chunk may increase in size as a result. In this case, the entire layout of the compressed file must be rearranged to accommodate the larger chunk. While it has been proposed to instead store a chunk that has grown larger than its original size at the end of the file (i.e. out-of-order), this solution will impact the efficiency of disk access where optimal access requires that files be in-order.

The foregoing techniques have been implemented as part of operating system (OS) file systems. As a result, every file stored on the system is treated in the same manner, regardless of whether the data is truly benefited by the transform. For example, random data does not compress well, and segmenting it for purposes of compression may actually degrade access time to these files. Because the segmenting process is inaccessible to the user of the computer system when it is performed as part of a file system, there is no way to easily disable the segmenting process as to files that do not benefit from the transform Nor is there any way to fine tune the segmenting process to optimize the performance advantages with respect to the files on the system. The segmenting process is fixed and applied to all files in the same manner, and the parameters of the process are inaccessible by a user at the file system level.

SUMMARY

The invention, in one aspect, is a method of storing transformed files of a computer system on a slow memory for random access to data comprising the transformed files. Each of the transform system files is divided into data segments which are then converted into respective data chunks in accordance with a predetermined transformation, such as a particular data compression algorithm or data encryption algorithm. Each of the chunks is stored in a bag of slow memory space wherein each bag further comprises a gap of unused slow memory space that accommodates increases in chunk size that results when data is written in a corresponding bag.

The invention, in another aspect, is a method for storing a computer file in a memory. Specifically, each of a plurality of chunks is stored in a respective bag, each chunk being a transformed version of a respective segment of the file that was subjected to a particular transformation, and each bag comprises a portion of contiguous space in the memory associated with a respective one of the segments. Each bag has a gap of unused memory space that can accommodate increases in the size of chunks stored in each bag, which can happen when, for example, a chunk is read from the memory, the chunk is reverse-transformed to recover the respective segment, and the segment is altered in such a way that, when the segment is re-transformed prior to being stored back in the memory, the resulting chunk is larger.

DRAWINGS

DETAILED DESCRIPTION OF ILLUSTRATIVE EMBODIMENTS

Certain terms are used throughout the following description and in the claims to refer to particular process steps, process materials and structures resulting therefrom. As one skilled in the art will appreciate, those skilled in the art may refer to a process, material or resulting structure by different names. This document does not intend to distinguish between components, materials or processes that differ in name but not function. In the following discussion and in the claims, the terms "including" and "comprising" are used in an open-ended fashion, and thus should be interpreted to mean "including, but not limited to . . . "

The following discussion is directed to various embodiments of the invention. Although one or more of these embodiments may be preferred, the embodiments disclosed should not be interpreted as or otherwise used to limit the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

In an embodiment of the invention, system calls specifying associated file descriptors originated by system applications or other library programs are intercepted by a preload library. Each system call handled by the preload library respects its standard semantics such that return values and expected side effects are preserved. Put another way, the preload library operates transparently with respect to an application and the operating system. If the file(s) specified by the intercepted system call are determined to have been previously transformed by the preload library or are to be transformed once created, the library allocates a meta-data structure to maintain the relevant meta-data, which is initialized from the file on disk. Otherwise, no meta-data structure for the referenced file is created and the preload library simply passes the system calls directly to the OS for processing.

Subsequent I/O calls to files identified by the preload library as being subject to the transformation are processed through the preload library, affecting meta-data where necessary, and ultimately transforming/reverse transforming the file data as required during operations such as reads and writes to those files respectively. In addition to the meta-data, only transformed segments are stored to slow memory (e.g. such as to the system disk drive). Whether or not the library creates new files in its transformed format or in raw, untransformed format is parameterized. The library can thus work seamlessly with extant applications, and with any OS.

Figure 1:
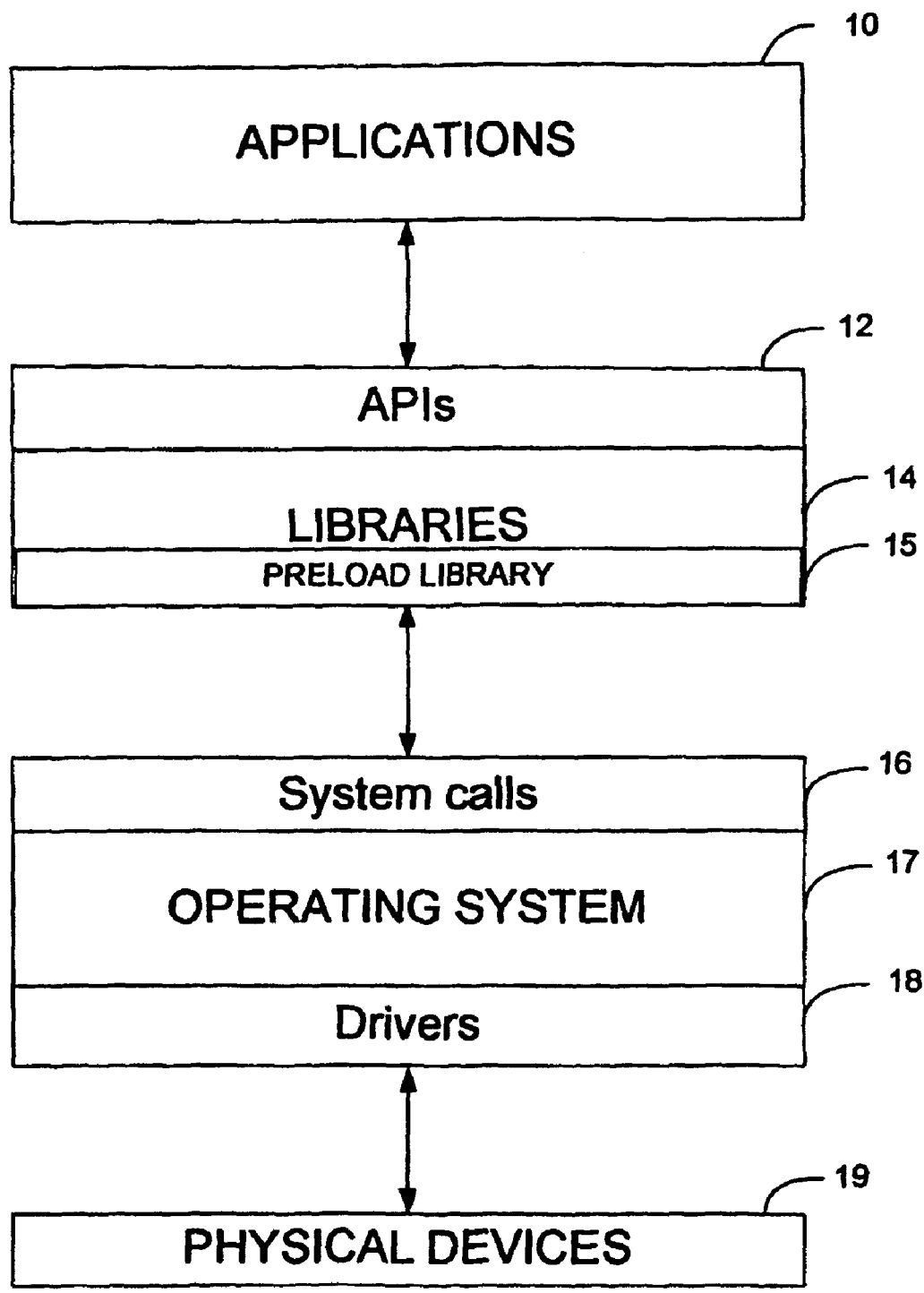
FIG. 1 is a block diagram representation of the relationships between the various functions operating in a computer system.

FIG. 1 illustrates the functional layers that exist in a typical computer system. The computer system could be a notebook or desk top computer, and could be as complex as a server with multiple CPUs. At the bottom of the functional stack are the physical devices of the computer system 19, including the disk drive/memory of the computer system. The operating system (OS) 17 communicates with the physical devices 19, typically through an interface of software routines sometimes known as drivers 18 for each device. The OS 17 performs functions that include maintaining internal data structures such as a file table to provide a record of all of those files that have been opened at the request of application programs 10 or other libraries 14. The OS 17 further maintains pointers into those files so that it knows where in a particular file data has just been read from or written to (i.e. accessed) and the next location. Thus, the OS 17 will know from where to start reading, for example, if an application 10 requests the next 1000 bytes of the file. There are a few different OS programs available from a few different sources, including Linux, Microsoft and the like.

The applications 10 and other libraries 14 typically make requests of the OS 17 and receive responses to those requests from the OS 17 by way of application program interfaces (APIs) 12. These APIs for a given application may differ with respect to the OS 17 used. Nevertheless, the system calls from a functional standpoint are quite similar, including basic system functions such as "open a file," "read from a file," "write to a file," "close a file," "create a file," etc.

The library layer 14 sits between the applications 10 and the OS 17. It is generally designed to perform functions that one may not wish to incorporate into the OS 17, at least until they've been proven, or to provide functions over which the user may want control. Typically, a library function 14 intercepts certain system calls from the applications to the OS 17. It then performs some sort of processing in response to the call and then passes on a call to the OS 17 by which to complete the processing.

Figure 2:
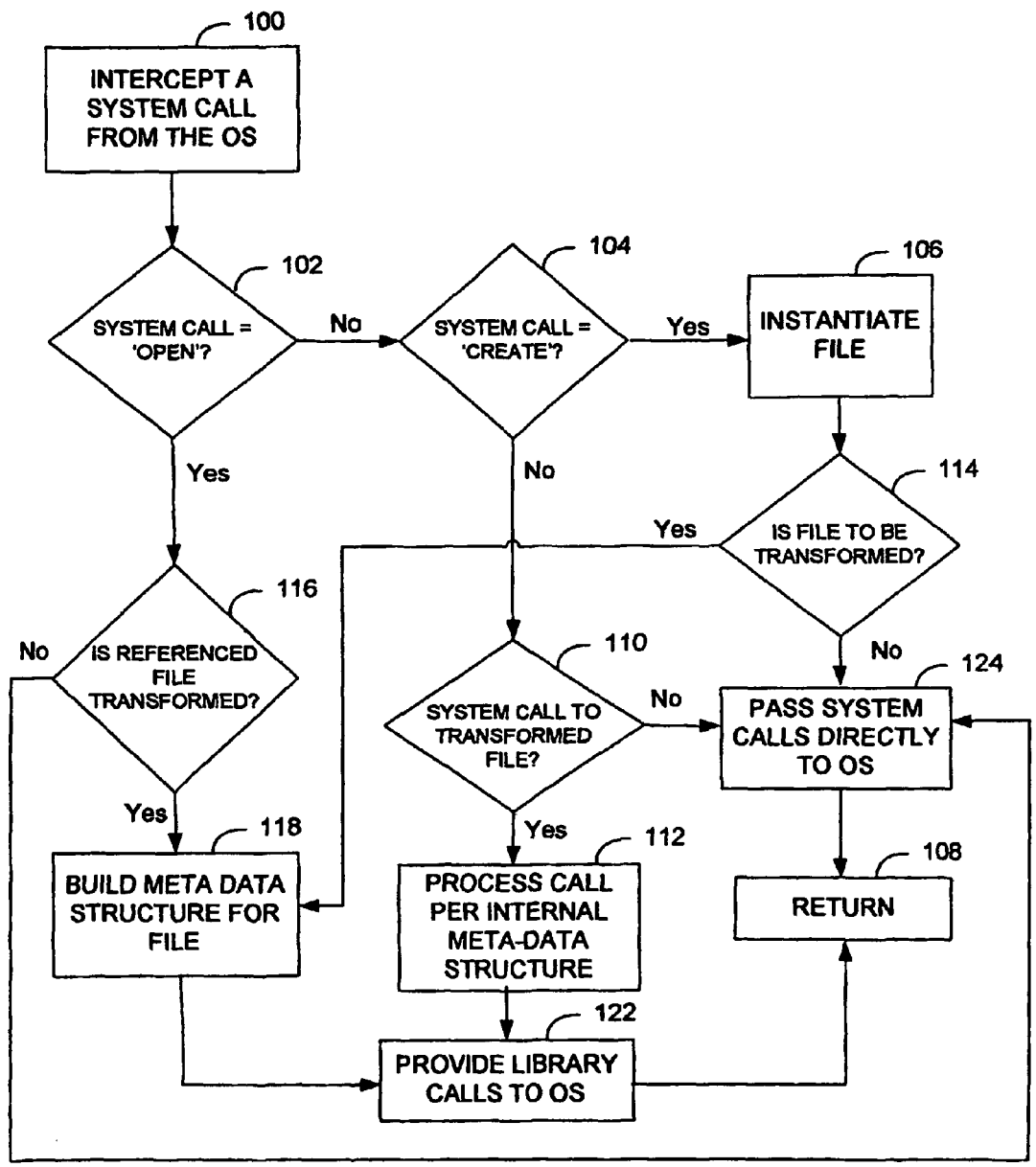
FIG. 2 is a block diagram representation of the functional operation of the computer system.

FIG. 2 illustrates a functional flow diagram for an embodiment of the invention. The library of the invention 15 can be preloaded and sits at the bottom of all other library functions 14, FIG. 1. It is designed to detect and intercept all system calls generated from applications 10, FIG. 1 and any of the other libraries 14, FIG. 1 (together sometimes referred to herein generally as system programs) to the OS 17, FIG. 1. Those of skill in the art will recognize that the preload library 15, FIG. 1 can be designed to recognize the semantics of system calls for any OS. When the preload library detects and intercepts a system call to the OS at 100, it determines the nature of the syste ccm call. Thus, if it is determined to be an "open a file" function specifying an existing file at 102, the preload library determines whether the particular file referenced has been transformed in accordance with the library's transform at 116 (i.e. whether it is a transform system file). If it has been so transformed, the library builds a meta-data structure at 118 for that file, much like the OS does in response to system calls, which controls ensuing system calls to that file's descriptor. The preload library processes all subsequent system calls to that file, including reading transformed data, inverting or reversing the transform on the data and providing the processed data to the application or library that requested it, performing the transform on data to be written back to disk and providing the transformed data back to the OS to carry out the physical write process. The preload library passes call commands to the OS at 122 that the OS needs to build its own internal structure such that the any processing performed by the preload library remains transparent to the OS as well as the application or library that initiated the call. Processing then returns at 108 to block 100 to look for and intercept further system calls from applications or other libraries at 100.

If at 116 it is determined that the existing file specified by the call has not been previously transformed in accordance with the transformation process implemented by the preload library, the system call is passed directly to the OS at 124 without further processing by the preload library, and processing returns at 108.

If the call is determined at 104 to be a "create a file" function, the library instantiates the file at 106 and then determines at 114 whether the files is one which it is to transform. This decision is based on parametric information provided to the library when it is loaded and permits a user to cause the library to process only those files that a user desires to be transformed. If the file is one designated to be processed by the preload library (i.e. a transform system file), it builds its meta-data structure to govern further processing of the file at 118 and processing continues as previously described. If it is not, processing continues at 124 and the system call is passed directly through to the OS. Processing returns at 108 to block 100. As previsouly discussed, the transformation process can be turned off by the user if desired for all files or for particular types of files, for example if the transform does not provide performance enhancement on that type of file.

For all other system calls it is determined at 102, 104 that the system call is neither an "open" nor a "create" function. An embodiment of the invention determines at 110 if the call is to a file that has already been opened and that it has been designated as one to be transformed by the library. This can be answered in the affirmative if it has already been opened and a meta-data structure previously has been created by the library at 118. If true, the call is processed by the library at 112 (including for example, reading transformed data and then performing the inverse transform on the data before supplying it to the requesting application or library, or transforming data from the application and then sending it to the OS to be written to slow memory). If it is determined at 110 that the system call does not reference a file that has been identified to the preload library as one to be transformed, then the system call is passed directly to the OS at 114 and processing returns at 108 to intercepting the next call at 100.

As previously discussed, the library can be applied generally to any data files that have been transformed and for which improved random access to the transformed data is desired. In an embodiment, the preload library may be employed where compression is the transform imposed on the data. The data is segmented and compressed (i.e. transformed) on a segment-by-segment basis to enhance random access to the compressed data.

Figure 3:
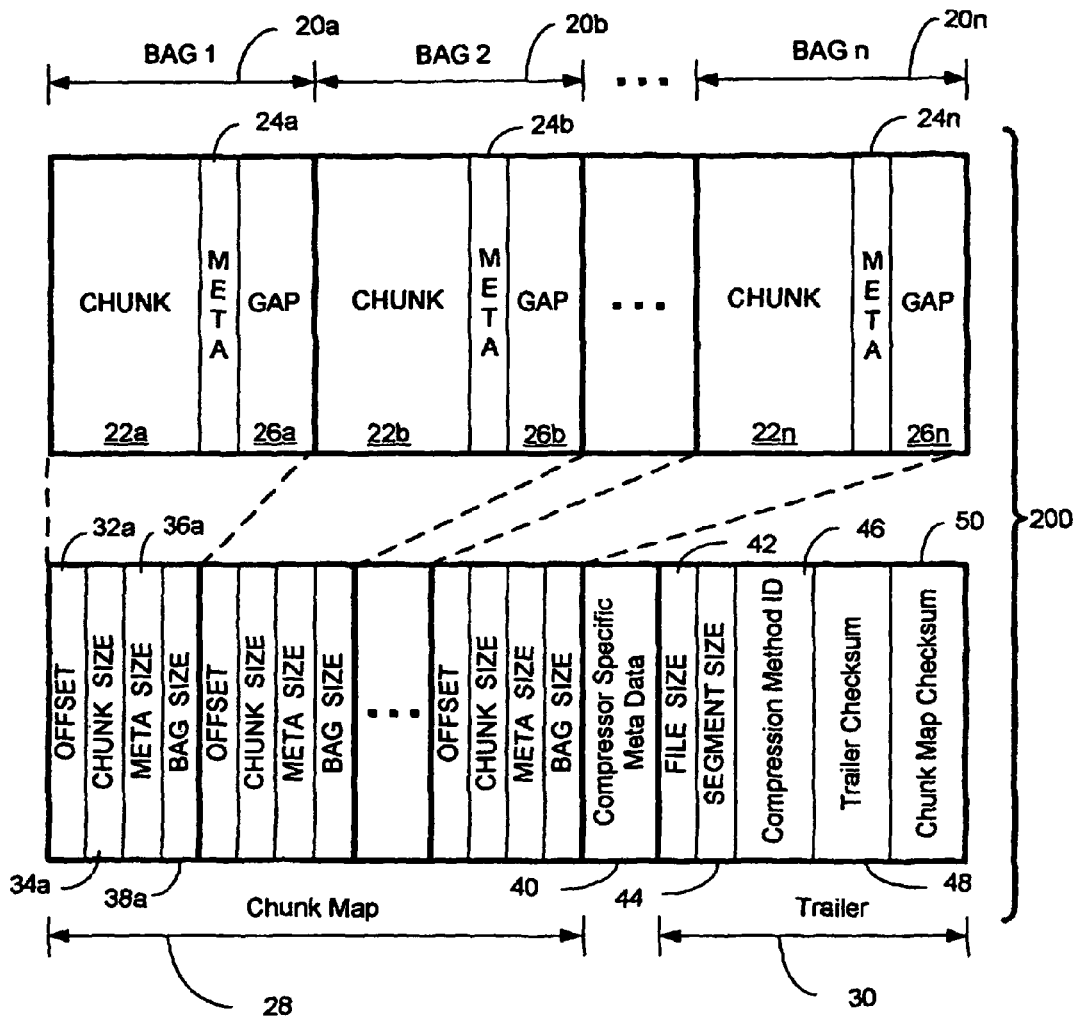
FIG. 3 a diagrammatical representation of a format for storing transformed data in accordance with an embodiment of the invention.

In an embodiment of the invention, a compression transform is performed at block 112 of FIG. 2 whenever the compression transform is enabled for the file being written. The original data is partitioned into n segments of size S each. This is a parameter that may be tuned by the user through interaction with the preload library. The last segment in the file possibly may be smaller of course. An embodiment of a format for the files transformed using such a compression algorithm is illustrated in FIG. 3. A file 200 compressed by the library can be implemented in two sections. The first section includes the compressed data for each segment of the untransformed data file. The second section of the compressed data file 200 is meta-data that includes a 28 map that identifies the relationship between each compressed data segment and each pre-compressed data segment. Thus, a segment may have a size of 1000 bytes (with a certain address range associated therewith), and each compressed segment (referred to herein as a chunk) may range between 360 and 440 bytes, for example. Of course, the preload library must be able to know how the address ranges of the chunks correspond to the address ranges of the pre-compressed segments, as the applications/libraries, oblivious to the compression, will request bytes based on the pre-compressed addresses.

As can be seen from FIG. 3, the compressed data for each of the n segments is stored as chunks 22*a*, 22*b* through 22*n*, and each chunk is part of a bag 20*a*, 20*b* through 20*n*. Each bag further includes a gap 26*a*, 26*b* through 26*n*, which is simply unused contiguous memory that is there in case the chunk actually grows larger as a result of modifications to its corresponding segment. The size of the bag, which includes the chunk 22 and the gap 26 will be determined by the original size C of the chunk (that is the size of the chunk 22 for each segment when the compressed file 200 is initially created and processed at block 106 of FIG. 2) and a bag factor f≧1. Thus, each bag can have a size of f*C bytes. The bag factor f determines essentially how much additional space to allocate for that chunk based on a percentage of the chunk's original size. This is another library parameter that can be adjusted by the user to optimize access speed for particular file types. In fact, these parameters can be adjusted for different types of files through the meta data of each file so that the transformation can be performed differently for different files stored in the same system. This is an advantage that is not easily accomplished using an OS file system.

The gap 26a, 26b through 26n provides slack for the chunk to grow which may occur when amended data is written back to a particular compressed segment. This overcomes the need to re-layout the entire compressed file to accommodate the growth of a chunk because they are not tightly packed. At the same time, the gap 26a, 26b through 26n is only a small percentage of what memory space is saved through compression. In an embodiment, should the chunk grow larger than the gap size, the bag is now too large for its original allocation of space and may be appended at the end of the compressed data section of the compressed file 200. The bag is also allocated a small amount of space for chunk specific metedata 24a, 24b through 24n.

In an embodiment, the meta-data section of the compressed (transformed) file 200 can be stored immediately following the last gap 26n of the last bag 20n. The meta-data can start with a chunk map 28, which is an array containing for each bag 20 the offset 32 into the compressed file at which the bag 20 begins, the size 34 of the chunk 22 within it, the size 36 of any chunk-specific compression meta-data 24, and the size 38 of the bag 20 to which the meta-data is mapped. Following the chunk map 28 is a variable-length segment describing any compressor-specific meta-data 40 (for example, if a Lempel-Ziv algorithm is being employed, what level is being used). Finally there is a trailer 30 containing the size 42 of the original, uncompressed file, the segment size S 44, an index 46 identifying the compression method (e.g. Lempel-Ziv, Huffman Coding, Burrows-Wheeler, etc.), a checksum for the trailer itself 48, and a checksum for the chunk map 50. Those of skill in the art will recognize that this meta-data provides an opportunity to vary the transformation (e.g. compression) process on a file-by-file basis.

When a compressed (transformed) file 200 is opened (the process represented by blocks 102, 116, 118, 122, FIG. 2) the meta-data is read. The trailer 30 is of a fixed size, so it is read first. Each compressor program has a method that includes a startup routine, which is called to read its meta-data 40 (e.g., the compression level for Lempel-Ziv based compressors like zlib), which precedes the trailer 30. Finally, the chunk map 28 is read, using the uncompressed file size 42 and segment size 44 to determine its length. The meta-data remains entirely in memory while the file 200 is open Those of skill in the art will recognize that it is possible for the data section can shrink and grow, and therefore could possibly overwrite the original meta-data. When the file 200 is closed, the revised meta-data is simply appended to the very end of the current data section, whatever size it has grown or shrunk to be. This layout has the benefit that the data can be read from, cached, and written to disk as needed, while the meta-data, which is small compared to the data, remains in memory.

Finally, all physical disk I/Os are performed with respect to a block size, which is provided as a parameter to the library upon start-up. This allows physical disk devices to be opened. Block sizes can be arbitrary, but the library assumes that any compressed file 200 is a multiple of the block size. Blocks and chunks are cached, in separate caches each with an LRU replacement strategy; the per-file cache sizes are also library start-up parameters.

Those of skill in the art will recognize that the foregoing format as applied to compression can be adapted to other types of transforms that may require random access to the transformed data, and for which segmenting and transforming the segments may prove useful in providing such random access. Moreover, the format may provide performance benefits concerning the possibility that the transformed chunks may grow or shrink and thus prove useful in accommodating this expansion and contraction without need to place chunks out-of-order or to have to rearrange the entire transformed file each time it is written to. Encryption is another example of such a transformation.

The following describes some of the system calls that an embodiment of the preload library is designed to intercept within the context of compression transforms, although they can be applied similarly to other types of transforms such as data encryption. The following discussion details the actions that may be taken by the library in processing the intercepted system calls listed below, before permitting them to proceed to the OS as is standard when an embodiment of the invention is not active on a system:

{open, create} On an existing file, open( ) first determines if the requested file is compressed. In an embodiment of the invention, a file may be deemed compressed if all of the following are true: (1) it is long enough to contain a trailer 30; (2) the trailer checksum 48 validates; (3) the segment size 44 is positive; (4) the compressor identifier 46 is valid; (5) the compression method successfully initializes its meta-data 40; (6) the file is long enough to contain a chunk map 28; (7) the chunk-map checksum validates 50; and (8) the chunk map 28 is consistent (bags 20a, 20b through 20n) are disjoint and in valid address ranges). On large files, test (8) can be skipped. Of course, those of skill in the art will recognize that any combination of the foregoing tests may be used to determine if the file has been transformed by compression, but the more that are used the more likely the determination will be correct. If a file is deemed compressed, an internal structure is initialized, which controls ensuing system calls on the file descriptor identifying the file just opened. A start-up parameter can be implemented to determine whether newly created files are to be compressed, or even which types.

{close} Any dirty cached chunks are written, any dirty cached blocks are flushed to disk, and the meta-data is written to the end of the file.

{lseek} An internal locator is set to the logical position of the uncompressed data.

{read, pread} The appropriate chunks are located and brought into cache if necessary. Chunks are uncompressed when read from disk, and the underlying segments are preserved in the cache.

{write, pwrite} The appropriate chunks are located and brought into cache if necessary. New chunks and bags are created as necessary for writes beyond the current end-of-file, with zeros filling any holes. Segments are updated in the cache and only recompressed when flushed.

{dup, dup2} The internal structure is updated to reflect the duplicated file descriptor.

{stat, fstat, lstat} The underlying system calls are performed on the file, with the size information updated from the meta-data.

{fcntl} Dup functionality and setting append mode affect the internal structures; other commands are passed through.

{fsync, fdatasync} Dirty cached chunks are written, and dirty cached blocks are flushed to disk. Meta-data remains in memory.

{truncate, ftruncate} The size is updated internally. Length increases create zeros as needed. Decreases are reflected in the metadata; subsequently cp'ing the file eliminates any discarded data.

{exit} All cached data and meta-data is flushed.

The invention claimed is:
1. A method for storing a computer file in a memory, the method comprising, storing each of a plurality of chunks in a respective bag, each chunk being a transformed version of a respective segment of the file that was subjected to a particular transformation, and each bag comprising a portion of contiguous space in the memory associated with a respective one of the segments, said each bag having a gap of unused memory space that can accommodate increases in the size of chunks stored in said each bag, reading a particular one of the chunks from the memory, subjecting the particular one of the chunks to a reverse transformation to recover the respective segment, altering the recovered segment and subjecting the altered segment to said particular transformation, the altering being such that the resulting chunk is larger than the chunk that was read from memory, and storing said resulting chunk in the bag associated with the altered segment, this storing including storing at least a portion of said resulting chunk in the associated bag's gap.

2. The method of claim 1 wherein the particular transformation is data compression.

3. The method of claim 1 wherein the particular transformation is data encryption.

4. The method of claim 1 wherein the size of each said bag is a function of the size of the chunk initially stored therein.

5. The method of claim 4 wherein the size of said chunk initially stored therein is C and wherein said size of said bag is C multiplied by a bag factor $f \geq 1$.

6. A method of storing transformed files of a computer system on a slow memory for random access to data comprising the transformed files, said method comprising:

dividing each of the transformed files into data segments;

converting each of the data segments into data chunks in accordance with a predetermined transformation; and storing each of the chunks in a bag of slow memory space wherein each bag further comprises a gap of unused slow memory space that accommodates increases in chunk size that results when data is written in a corresponding segment.

7. The method as recited in claim 6 wherein the transformation is data compression.

8. The method as recited in claim 6 wherein the transformation is data encryption.

9. A computer program product, comprising a computer usable medium having a computer readable program code embodied therein, said computer readable program code adapted to be executed to implement a method of storing transformed files of a computer system on a slow memory for random access to data comprising the transformed files, the method comprising dividing each of the transformed files into data segments;

converting each of the data segments into data chunks in accordance with a predetermined transformation; and storing each of the chunks in a bag of slow memory space wherein each bag further comprises a gap of unused slow memory space that accommodates increases in chunk size that results when data is written in a corresponding segment.

* * * * *